G. W. BISHOP.
Velocipede.
No. 207,240. Patented Aug. 20, 1878.
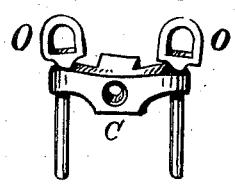
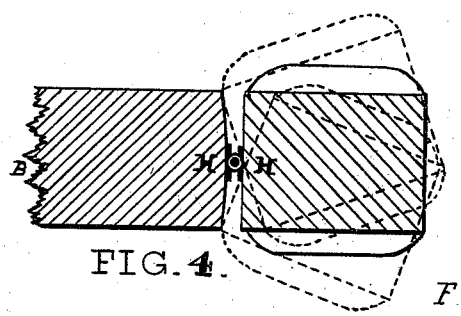
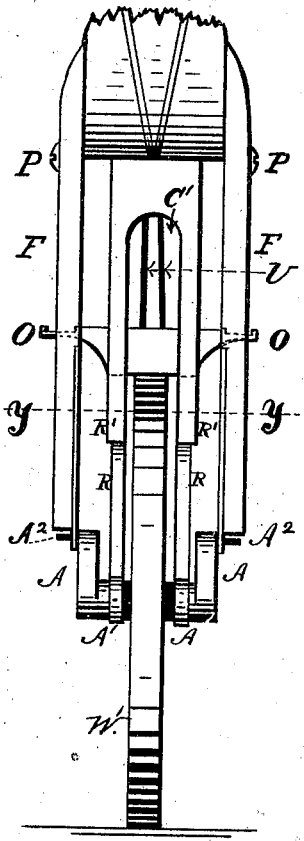
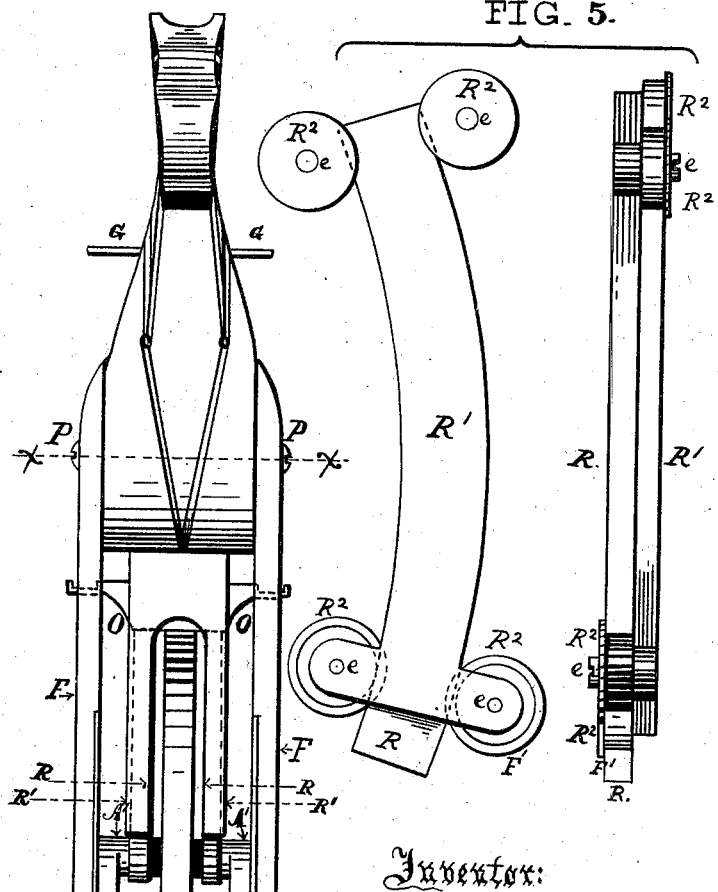

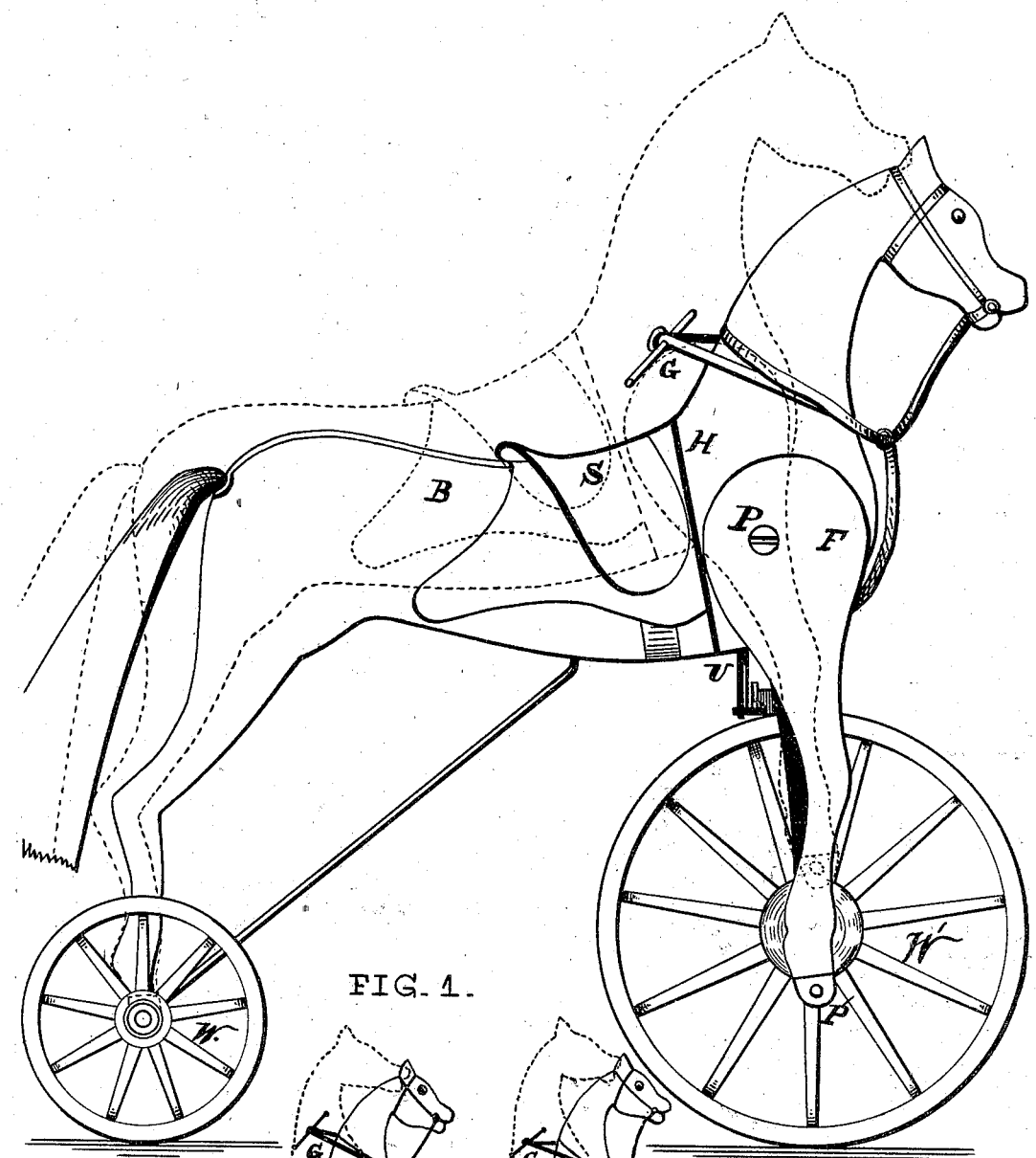

UNITED STATES PATENT OFFICE.

GEORGE W. BISHOP, OF BROOKLYN, NEW YORK.

IMPROVEMENT IN VELOCIPEDES.

Specification forming part of Letters Patent No. 207,240, dated August 20, 1878; application filed February 13, 1878.

*To all whom it may concern:*

Be it known that I, GEORGE W. BISHOP, at this time residing at No. 549 Herkimer street, in the city of Brooklyn, county of Kings, and State of New York, have invented a new and useful Improvement in Vehicles for Self-Propulsion, of which the following is a specification:

The invention relates, broadly, to a vehicle which carries it own propelling power in the person of the rider, and, more narrowly, to that species which are propelled by the weight and muscular strength of the rider, in combination, and acting by either at will or simultaneously or alternately for that purpose.

In a large number of this general class—known as "velocipedes"—are found one or more of the following elements, viz., a frame for the axle of the forward wheel, pivoted in the seat-supporting bar and reach which connects the forward and rear wheels; a fixed seat, upon which the rider sits astride of the reach; and also oppositely-projecting cranks on the axle of the forward wheel, provided with treadles or foot-rests connected with such cranks. This class is represented by the type shown in the Letters Patent of P. Lallemant, No. 59,915, dated November 20, 1866, and reissue thereof, No. 7,972.

My invention differs from this entire class in this, that the axle-frame of the forward wheel is not pivoted in the reach; that the seat is not fixed, but is, on the contrary, movable, and with it the body of the rider rises and falls; and that the cranks are neither oppositely projecting nor provided with foot-rests.

In another species the seat-support consists of a lever of the third class, formed in some instances like the body of a horse, the hind legs or feet being pivoted to or over the hind wheels, the power for locomotion being applied to the forward wheels at the front end of the horse, and the seat for the rider being located between these two points, and formed in other instances of a simple lever, pivoted at the rear end over the rear wheels, and connected to the driving-wheels in a similar manner. Of these there are two varieties, in one of which the body of the horse or lever is rigid from end to end, and in the other the body of the horse is rigid, but the fore legs are movable. The type of the first of these may be found in the Letters Patent of the United States granted to P. W. Mackenzie, No. 41,310, dated January 19, 1864, and in the reissue Letters Patent of the same, No. 7,818, dated July 31, 1877; and the type of the second of these may be found in the Letters Patent granted to P. W. Mackenzie, No. 39,349, dated July 28, 1863, and also in the Letters Patent No. 36,161, dated August 12, 1862, and the reissue Letters Patent of the same, No. 3,319, dated March 2, 1869. In the first of these types the reach, horse-body, or seat-support is connected to the forward driving-wheels by or through what is called in the original specification and claims "a cranked shaft with two or more centers," and which has substantially two crank-pins.

My invention differs from this type in this, that, although the horse-body and reach is a lever of the same class as that used therein, it is not connected with the driving-wheel by means of an axle provided with a crank or cranks through which power is applied at two opposite ends of the axle, but, on the contrary, is connected with the axle by means of a crank or cranks through which power is applied at one side of the axle, the other point of connection being furnished by the shaft itself. These two points are, first, that at which the movable pivoted fore legs of the horse, which are in effect links, are attached to one end of the crank, and, second, that at which the other end of the crank is attached to the driving-wheel at its center by its axle; and it also differs in this, that the feet of the rider do not rest on the crank or crank-pin to give rotary motion of the driving-wheel by the action of his weight, or muscular strength exerted by rotary motion and leverage of the foot around the driving-wheel center, but, on the contrary, rest on foot-rests connected by a relatively stationary frame directly with the driving-wheel center, whereon the foot remains stationary, or without variable relation as to the driving-wheel center, and is carried with the vehicle constantly on a line produced at an equal given distance from and along the ground.

In the second of the types alluded to the horse-body or reach is a lever of the same class as in the first, which is connected to the crank-pin on the crank of the shaft of the driving-wheels by the pivoted legs of the horse, and is operated by the rider, whose feet press upon foot-rests placed on a second or supplementary reach and platform, which is secured rigidly between the driving-wheel axle and the hind-wheel frame and axle, so as to have its bearing on the driving-wheel axle which turns therein. The crank in this case is the crank of a single axle located in the center of the driving-wheel, or a crank with one center only.

My invention differs from this type in this, that the rigid frame connecting the front and rear axles is dispensed with, and the body of the horse furnishes the sole connection between them, being in effect a seat-supporting lever, through which motion may be imparted to the vehicle by either alternately lifting the body of the horse through the handles and throwing the weight of the person upon the seat, with alternations of pressure by the feet upon independent foot-rests secured to the shaft of the driving-wheel, or by retaining the seat upon the horse-body while alternately exerting pressure of the feet upon the foot-rests, so as to give to the horse-body or lever an oscillating motion and to the driving-wheel rotary motion.

In all the inventions shown in these Letters Patent of Mackenzie the body of the horse is rigid, the vehicle is steered only by or through the hind wheels, operated by mechanisms extending therefrom under and to a point in front of the rider, whereas, in my invention the body of the horse is not rigid, but is hinged in front of the saddle, and is steered by the rider controlling the forward wheel through the movement of the front part of the horse-body by the hands, and also by the feet operating upon both or either side of the wheel.

The practical object of my invention is the production of a vehicle to be operated by the rider through the action of his legs, arms, and chest, and also by his weight, all so used as to imitate the motions of a running or cantering horse and rider, and so as to employ the same in the most natural, easy, and effective manner; and it consists in the matters stated in the several clauses of claims attached hereto.

The horse-body B is supported on or over the shaft of the hind wheel or wheels W, as shown in Fig. 1, or in any convenient manner, is hinged forward of the seat or saddle S, as shown at H, Figs. 1 and 4, and is provided with the guide bar or handles G, located at the base and upper side of the neck of the horse, preferably, where the hands of the rider would naturally reach the reins if he were riding a living horse. These handles should be secured to the horse body or neck in any convenient manner, but so firmly as to enable the rider to exert all his strength in lifting the horse and in steering.

I prefer to attach the horse-body to the hind axle by those parts which represent the feet or hoofs, and as low down as possible, in order to give the rider a better control than he would have if the point of attachment was high up and approached a horizontal line. The horse body and legs may be so shaped and disposed, if desired, as to bring this pivotal point under, or nearly under, the seat, and in case of the employment of high hind wheels the axle may be bent down between the wheels or on each side of the single hind wheel, the use of which I contemplate in place of the two wheels shown whenever desired. The single hind wheel may be placed between the legs of the horse, or in any equivalent relation to the lever used.

The fore legs of the horse, F, are pivoted to the body the the horse in the natural position by means of the screw-pins P P, or in any suitable manner, and at the part representing the feet connecting-plates $P'$ $P'$, or other suitable devices, connect the legs with the arms A A by means of pins or secondary axles $A^2 A^2$, the other ends of which arms are secured to an axle, $A^1$, located in the center of the driving-wheel $W'$. The pivoted fore leg may, however, be dispensed with, a rigid leg being substituted therefor with a joint at the knee, as shown, or with a longitudinally-slotted plate attached to each foot, so as to receive and operate the crank-pin in the manner usual in other kinds of mechanism.

The hinge at H may consist of one or more ordinary hinges provided with two leaves, and these leaves may be inserted and secured in slots fore and aft in the body of the horse, or in any other way which may suggest itself to the ordinary mechanic familiar with the hanging of doors upon hinges; but care should be taken to make the hinge attachment strong enough to bear the strain brought thereon, according to the weight of the rider, and also to leave sufficient space between the adjoining parts to permit the necessary variation in the direction of movement of the wheel $W'$ for steering purposes. The leaves may best be made to project on each side straight or radially from the eyes, in order to give equally free motion to both sides in turning.

The two arms A A project in parallel lines from the axle $A^1$ on opposite sides of the driving-wheel $W'$, and the second axles, $A^2 A^2$, connect it with the plates $P' P'$ at the fore feet of the horse. R and $R'$, Figs. 2 and 3, are interior and exterior slides or slide-rods, respectively. They are both forked, and straddle the driving-wheel, the former being provided at the lower end with bearings, which grasp and hold the axle $A^1$, so that it may easily turn therein, and at the upper end with laterally-projecting foot-rests O O.

The exterior slides $R^1 R^1$ are firmly secured to that part of the body which represents the lower breast of the horse between the two fore legs. As the horse-body rises and falls between the two positions represented in Figs. 2 and 3, and in Fig. 1 in full and in dotted lines, the slides $R^1 R^1$ slide on the slide-rods R R, which they grasp firmly, and so steady the body as to prevent lateral swaying and give control at all times over the wheel W' for the purposes of steering the vehicle. By employing this device I am able to discard the supplementary reach and platform previously required to support the foot-rests for the feet of the rider, and to connect the fore and hind wheels; and, so discarding this reach, I gain the control of the fore driving-wheel for steering purposes, and also independent foot-rests.

Fig. 6 shows an arrangement for adjusting the foot-rests or stirrups. The foot-rests O O are provided with stems which may be made to screw up and down in the cross-head C, or they may be perforated and pinned at any desired point or points. Various other methods of adjusting these rests will occur to the mechanic, and the shape and location of the cross-head C may be so varied as to allow the feet of the rider to come as near the ground as convenience and various lengths of lower limbs may require.

U is a rubber spring, represented as attached to a projection from the cross-head C at one end and to the horse-body at the other. Its object is to assist the rider in operating the vehicle in a manner to be described hereinafter. I contemplate the use in some instances of an equivalent method, which consists in securing a band or other spring, preferably of steel, one end to the under side of the horse-body and the other to the cross-head, so arranged as to have a downward action upon the horse-body. This action may be reversed; but since the downward movement is given mainly, if not quite entirely, by the weight of the rider, which cannot be materially increased or aided at will, while the upward action is less limited and more subject to control and increase, I prefer the arrangement suggested.

Fig. 5 shows a side and an edge view of one kind of slides which may be substituted for those shown in Figs. 1, 2, and 3. The slides R R¹, shown in that figure, consist of curved plates, substantially alike, each provided at one end with two flanged rollers, R² R², secured by arbor-pins in projections from both edges of the slides. These rollers are intended to have a tread wide enough to bear on and across the edge of the opposite slide, front and rear, and the flanges F' are intended to hold the two slides together after the free end of each has been passed between the two opposite flanges of each set of rollers and the body of the slide opposite them. It is evident that these rollers may be increased to any necessary extent, and also that they, being oiled when necessary, and bearing chiefly on the edges of the slides adjacent, will diminish friction without diminishing the control necessary to enable the rider to operate, and especially to steer the vehicle. The slides R R¹, Fig. 5, show only the operative slide part of the frame, of which they form a part and by which they are sustained. In effect this frame is to the slides a rib extending centrally along each, with a cross-head connection at top.

The body of the horse being arranged so as to move on the rear wheel shaft or axle as a center, the slides R R¹ are curved accordingly; and as this center is varied in its location and distance from the center of the driving-wheel, the sweep of their curves must be also varied.

Fig. 4 is a section cut on line $xx$, Fig. 3, and Fig. 7 the same cut on line $yy$, Fig. 2.

The operation of the vehicle is simple and as follows: Supposing the rider to take his seat on the saddle S, place his feet on the foot-rests O O and his hands on the guide-bar G, when the parts are in the positions shown in Figs. 1 and 3, his knees being sufficiently bent, by merely rising, as I may say, in his stirrups, and lifting on the guide-bar G much as he would do if mounted on a living horse at starting, the legs F F, according as the arms A A may be in the rear or forward of a dead-center, will cause the driving-wheel to revolve forward or backward, and having reached the upward limit of motion provided for, as shown in Fig. 2, and the muscles of the legs and arms, as employed in lifting, being relaxed so as to cause the weight of the body to come upon the saddle-seat, this weight, aided by the spring U, will act through the legs F F upon the arms A A to complete the revolution of the wheel W', when the operation described may be repeated at will with more or less rapidity, resulting in more or less speedy traveling over the surface of the ground or floor. Meantime the two hands of the rider upon the guide-bar G at opposite sides of the neck of the horse will enable him to turn in either direction at will, or to keep moving in a straight line. With the hands of the rider holding the bar G firmly and his feet resting upon the foot-rests O O, he has absolute control at all times over the wheel W', either to give motion to the vehicle, to stop it, or to turn or travel backward; and when the knees are in a bent position, with the crank not at the dead-center, a sudden impulse of the feet will cause the driving-wheel to revolve without other aid of the hand, the force expended being exerted through the axle of the driving-wheel and that end of the crank-lever A which is attached thereto. The vehicle may also be propelled, and likewise steered, without using the guide-bar G in lifting or turning, through the same instrumentalities.

I claim as my invention—

1. In an auto-propelling vehicle, a seat-supporting rocking lever connecting the front and rear axles as a sole reach, provided with swinging links connecting the forward end of the rocking lever to the crank-arms of the driving-wheels.

2. In an auto-propelling vehicle, an imitation horse-body used as a rocking lever, a seat-support, and the reach between the front and rear axles, and provided with pivoted fore legs, connecting the rocking lever and propelling crank-arms for the purpose of giving motion to the vehicle, as shown and described.

3. In an auto-propelling vehicle, a jointed or hinged and rocking-lever seat-support, with the joint or hinge located so that the rider sitting in the seat can turn the front end of the rocking lever to right or left for the purpose of steering.

4. In an auto-propelling vehicle, a jointed or hinged and rocking-lever seat-support, a forward propelling-wheel, with fixed axle provided with crank-arms projecting radially in one direction from the axle on each side of the wheel, and links or legs connecting these cranks with one member of the rocking-lever seat-support, substantially as described.

5. The slides R and R', connecting a rocking-lever seat and a driving-wheel, as shown and described.

6. A horse-body rocking lever in an auto-propelling vehicle, connected and guided in its movements with and in relation to the driving-wheel by slides R R¹ or their equivalents.

7. The slides R R¹, one attached to the rocking-lever seat-support and the other to the axle of the driving-wheel, the two slides connecting together a seat-support and the driving-wheel, and controlling their united movements.

8. The horse-body rocking lever in an auto-propelling vehicle divided into two parts, hinged together, and the driving-wheel provided with cranks for turning the same, connected and guided in their relative and united movements by slides R R¹, or their equivalents.

9. The horse-body, or its equivalent, made in two parts, hinged together and provided with pivoted fore legs, each secured to the most forward of the two parts, and to the crank-pins of the driving-wheel cranks.

10. In a vehicle arranged for propulsion by a passenger, a seat-support connecting front and rear wheels, made in form of a horse, composed of two parts hinged together, the hind quarters and part of the body secured to or over the hind wheel or wheels, and the fore quarters and body provided with a guide-bar secured to a front steering and driving wheel so as to be turned therewith, substantially as shown and described.

GEORGE W. BISHOP.

Witnesses:
EDWARD I. HORSMAN,
GEORGE A. HAMMEL.